United States Patent [19]
Kakii et al.

[11] 3,797,346
[45] Mar. 19, 1974

[54] APPARATUS FOR CUTTING A ROLL OF COPYING MATERIAL ACCORDING TO THE LENGTH OF THE ORIGINAL

[75] Inventors: Shunichiro Kakii, Kugayama; Satoshi Hisabayashi, Tokyo, both of Japan

[73] Assignee: Iwasaki Tsushinki Kabushiki Kaisha, Tokyo, Japan

[22] Filed: Oct. 11, 1972

[21] Appl. No.: 296,533

[30] Foreign Application Priority Data
Nov. 10, 1971  Japan............................. 46/89085

[52] U.S. Cl................... 83/203, 83/365, 355/13
[51] Int. Cl................................... G03g 15/00
[58] Field of Search........ 83/203, 205, 365; 355/13, 355/28, 29

[56] References Cited
UNITED STATES PATENTS
| | | |
|---|---|---|
| 3,533,691 | 10/1970 | Suzuki et al. ..................... 83/205 X |
| 3,614,220 | 10/1971 | Komori ................................. 355/13 |
| 3,639,055 | 2/1972 | Schleifenbaum...................... 355/29 |

Primary Examiner—J. M. Meister
Attorney, Agent, or Firm—Oblon, Fisher, Spivak, McClelland & Maier

[57] ABSTRACT

A copying machine is disclosed having an apparatus for cutting a roll of copying material according to the length of an original positioned on a transparent supporting table. The cutting apparatus includes a device for optically detecting the forward edge of the original. The roll copying material and a moving member carrying the detecting device are driven at the same speed. When the edge detector detects the forward edge of the original, the cutter is triggered.

8 Claims, 6 Drawing Figures

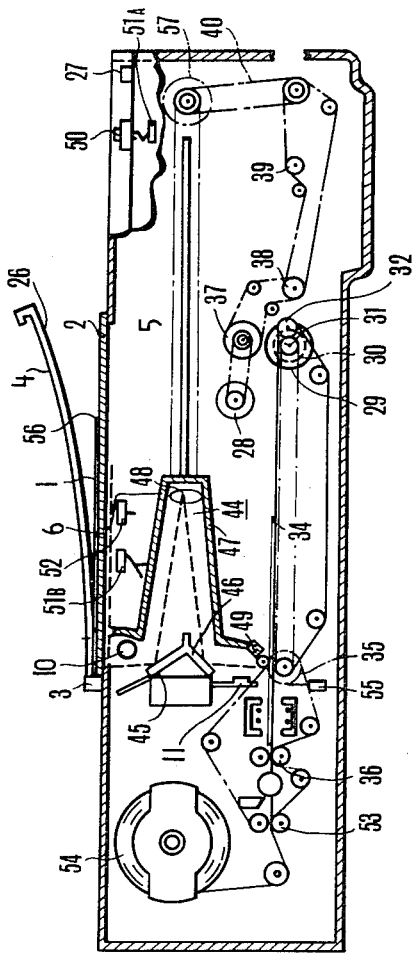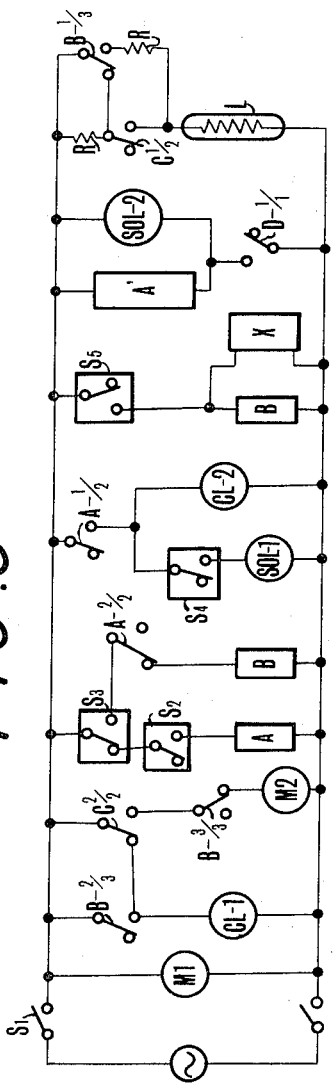

APPARATUS FOR CUTTING A ROLL OF COPYING MATERIAL ACCORDING TO THE LENGTH OF THE ORIGINAL

BACKGROUND OF THE INVENTION

1. Field Of The Invention

This invention relates to cutters in general, and more particularly to a cutter for a copying apparatus which cuts a roll of copying material of any size according to the length of an original placed on a transparent supporting table so that one edge thereof is at a fixed starting line.

2. Description Of The Prior Art

The many known types of copying devices include electrostatic copying machines in which a sheet of electro-photosensitive paper receives an electrostatic charge. This paper is then exposed to an image of an original positioned on a transparent supporting table by way of a lens system focusing the light to produce a latent electrostatic image of the original on the copying material. Variation in length from one original to another causes a waste of copying material, since the original may not be copied on a proper standard sized paper. As a result the cost of the copying paper consumed is very high.

An example of a type of apparatus designed to eliminate the above-mentioned drawbacks is disclosed in U.S. Pat. No. 3,656,851. According to that patent, a roll of copying paper is cut corresponding to the setting of a continuously slidable indicator which extends along the transparent supporting table on which the original is placed. However, such manual operation of the indicator causes reduction in work efficiency as well as inconvenience.

SUMMARY OF THE INVENTION

Accordingly, one object of the present invention is to provide a new, improved and unique apparatus having a cutter which cuts a roll of copying paper in any size in accordance with the length of the original without need for manually setting an indicator corresponding to the forward edge of the original.

Another object of the present invention is to provide a stationary exposure type copying apparatus having a novel cutter assembly.

Still another object of the present invention is to provide a scanning exposure type copying apparatus having a stationary original and a moving lens apparatus, and including a novel paper cutter.

Briefly, in accordance with the present invention, the foregoing and other objects are in one aspect attained by provision of a copying apparatus which includes a device for optically detecting the forward edge of an original positioned on a transparent supporting table. A cutter is operated by the detecting device so that a roll of copying paper is cut according to the length of the original.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a cut-away side view illustrating the primary interior construction of a scanning exposure type copying apparatus conforming to the present invention; and FIG. 5 is a schematic diagram of an actual example of the electric circuit used with the apparatus illustrated in FIG. 4.

DESCRIPTION OF THE PREFERRED EMBODIMENTS

Figure 1:
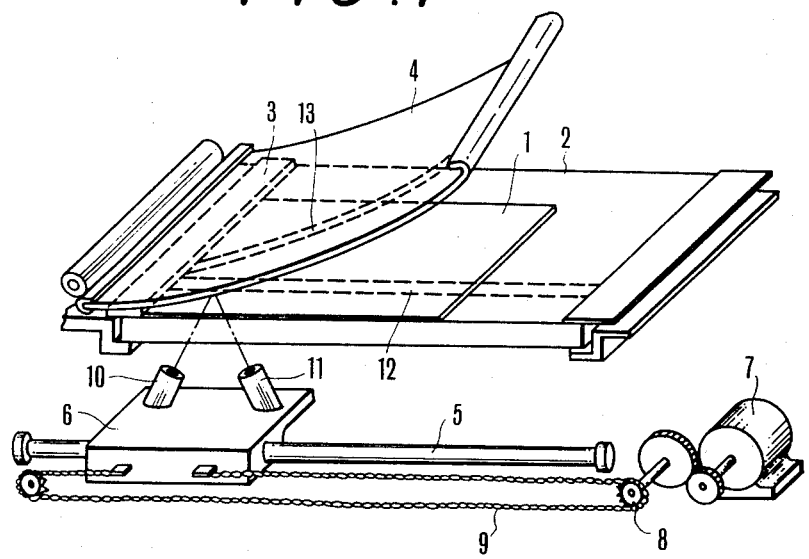
FIG. 1 is a schematic view illustrating the fundamental construction of the apparatus in accordance with the present invention.

Referring now to the drawings, wherein like reference numerals designate identical or corresponding parts throughout the several views, and more particularly to FIG. 1 thereof, the fundamental principles of the present invention will now be described. An original 1 is positioned on a transparent supporting table 2 (generally a glass plate), so that the original may be aligned with a fitting 3, and is then pressed into close contact with the transparent supporting table 2 using a pressing plate 4. However, the pressing plate 4 is not necessarily required to attain the object of the present invention. A guide rail 5 is located in parallel with the transparent supporting table 2. A movable member 6 extending along the guide rail 5 is moved leftward or rightward at a uniform speed by a motive power source, such as a motor 7, which drives a sprocket 8 engaged with the links of a drive chain 9. The movable member 6 is provided with a light source 10, such as an illuminating lamp or a light emitting diode, for detecting the length of the original and with an optical detector 11 for sensing the amount of light reflected from the surface of the original. The light source 10 and the optical detector 11 are respectively mounted on the movable member 6 so that light rays emitted from the light source 10 may be refracted in the transparent supporting table 2 and then reflected from the surface of the original 1 and again refracted in the transparent supporting table 2 before entering the optical detector 11. The optical detector 11 comprises a photoelectric transducing element such as CdS cell. A focusing lens (not shown in FIG. 1 ) is placed before the optical detector 11.

When the amount of reflected light, corresponding to the average optical intensity of a band-shaped optical trace 12, reflected from the surface of the original and received by the optical detector 11 is less than a certain value, a signal is applied to an electric circuit X (shown in FIG. 2) coupled to the output of the optical detector 11. It is preferable to place the original 1 on the transparent supporting table 2 so that the rear edge thereof is at the fixed fitting 3 for the purpose of establishing the positional relation between the original and the movable member 6. The band-shaped optical trace 12 is preferably positioned on the relatively large white background area of the original (i.e. the area free of recorded characters), since when the band-shaped optical trace 12 is located on the characters of the original defining large black regions, the amount of light reflected from the surface of the original may be less than the threshold value. In that case there is a possibility that the detecting circuit X may operate to send a signal to the cutter without detecting the true length of the original 1. Indeed, if the width of the band-shaped optical trace 12 is set at about 10 mm, no troubles should arise unless the band-shaped optical trace 12 is located on a print region which provides a wholly black background. Thus, when the movable member 6 moves corresponding to the optical trace 12, and then reaches the rear of the original 1, the optical detector 11 senses any change in the amount of light reflected from the surface of the original 1 so that the length of the original 1 is detected optically. A signal is then applied to a cutting mechanism (shown in FIG. 4) so as to cut the roll of copying paper according to the length of the original 1.

When the pressing plate 4 is used, it is necessary to attach a black non-reflecting part 13 thereto which is wider than the band-shaped optical trace 12 drawn by the movable member 6. The black non-reflecting part 13 is made of a printed, painted or inlaid black material, or the like, which won't reflect light rays.

Figure 2:
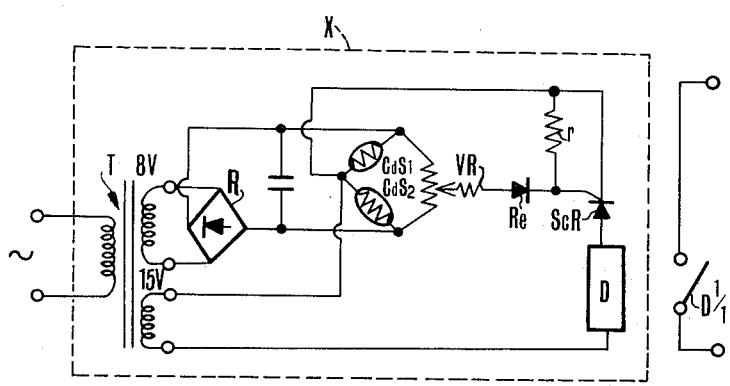
FIG. 2 is a schematic diagram of one form of a detecting circuit for sensing the amount of light reflected from the surface of the original.

FIG. 2 provides a schematic diagram of the detecting circuit used in the optical detector 11 for sensing the reflected optical intensity according to the present invention. Photoelectric transducing elements, such as cadmium sulfide cells CdS-1 and CdS-2 or the like, which form a circuit called a photobridge, are employed as photosensitive detecting elements. A d-c source is used for powering the photobridge. The d-c source includes a step down transformer T and a full wave rectifier R. A resistor r and a rectifier Re for protecting a silcon controlled rectifier SCR are respectively connected therewith. The photobridge is balanced by an amount of light predetermined by setting a variable resistor VR. When the amount of reflected light is less than a certain value, the photobridge will become unbalanced and a gate current will flow into the SCR to turn it on. As soon as the SCR is on, a relay D operates to close a contact D-1/1. Simultaneously a rolled copying paper cutting circuit (shown in FIG. 5) operates so that a photosensitive paper roll is cut by a cutting device.

Figure 3B:
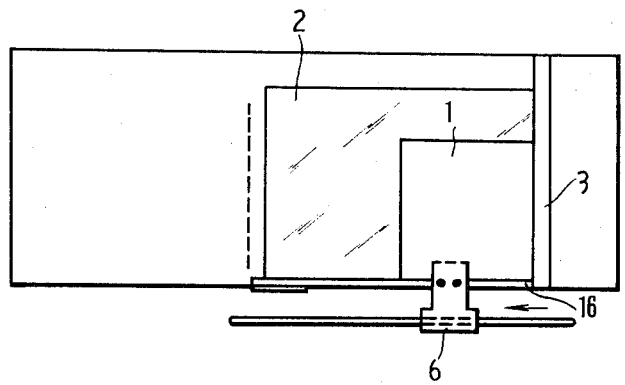
FIG. 3B is a plan view of the apparatus illustrated in FIG. 3A.
Figure 3A:
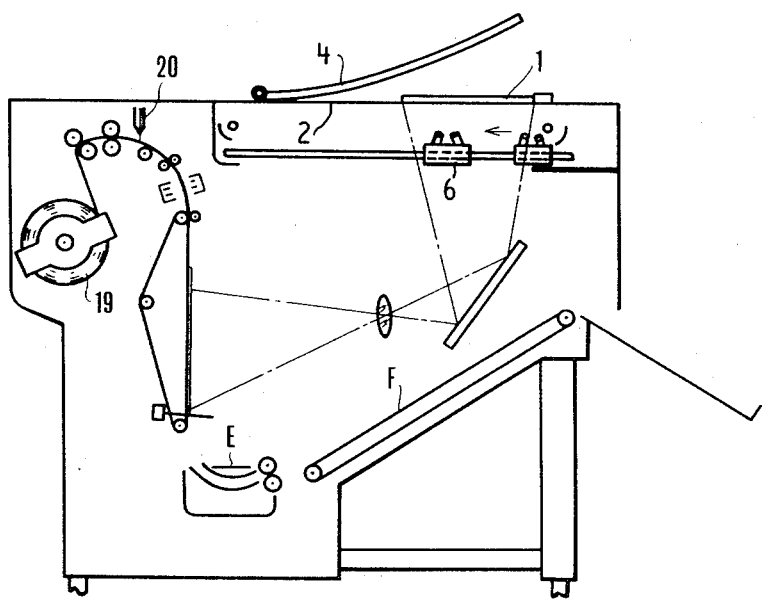
FIG. 3A is a cut-away side view illustrating the primary interior construction of a stationary exposure type of copying apparatus conforming to the present invention.

FIGS. 3A and 3B shown a stationary lens system exposure type of copying machine comprising apparatus according to the present invention. FIG. 3A is a sectional view showing the primary interior construction of the apparatus, and FIG. 3B is a plan view of the apparatus of FIG. 3A. The original 1, turned upside down, is positioned on the transparent supporting table 2 with the rear end of the original abutting the fitting 3 and one side thereof abutting a fitting 16. The pressing plate 4, which is provided with a black non-reflecting part as described above, is then placed over the original 1. When a print switch (see FIGS. 4 and 5) is pushed, a roll of photosensitive paper 19 turns, and then the forward end thereof is fed through a cutting device 20. Simultaneously the movable member 6 travels leftward at the same speed as the rolled copying paper is being fed, and then detects the forward edge of the original 1 according to the above described method. The cutter device 20 is activated to cut a length of copying paper corresponding to the length of the original.

Thereafter the photosensitive paper is given a latent electrostatic image using an exposure device. The paper bearing the latent electrostatic image is driven forward into a developing device E and is then transported by means of a conveyor belt F to a drier.

Referring now to FIG. 4, a preferred embodiment of the primary interior construction of the copying machine of the present invention is shown. FIG. 5 illustrates the electric circuit of the apparatus of FIG. 4 with the exception of the circuit for detecting the length of the original which is shown in FIG. 2.

Since the electrostatic charging process, the developing process, the drying process, and the multi-copying mechanism, etc. used in the copying apparatus of the present invention are all well known and are described in U.S. Pat. No. 2,551,582 to Carlson, a detailed description of these features will be omitted.

Now, the original 1 is positioned on the transparent supporting table 2 with the rear edge thereof corresponding to the fitting 3, while a surface 26 of pressing plate 4, provided with the black non-reflecting part 13 is placed over the original, as mentioned above. When a main switch 27 (S1 in FIG. 5) is manually pushed, a main motor 28 (M1 in FIG. 5) turns and then a main clutch 29 (CL-1 in FIG. 5) engages with a gear 30 so that a transport belt 34 turns through gears 31, 32 and the like. This motion is further transmitted to a mechanism for feeding the copy material through a sprocket 35 to rotate a feeding roller 36. The main motor 28 functions to rotate a group of rollers 38, 39 used for developing, and then to extend the movable member 6 rightward through a driving chain 40. In this operational phase, a clutch 57 (C1-2 in FIG. 5), which couples the driving chain 40 and the movable member 6, is not yet energized, and the movable member 6 therefore does not move. This movable member is provided with a light source 10, such as an illuminating lamp, having the functions of both scanning the original and detecting the length of the original, and also with a means for detecting the reflected optical intensity from the surface of the original (as described above), and with a scanning optical system 44 for copying the original. The scanning optical system 44, which exposes a copying material fixed on the transport belt 34 comprises a housing 47, a lens 48 with a reflecting mirror at the rear thereof and reflecting mirrors 45 and 46 which are inclined at 45° with respect to an imaginary horizontal plane including the optical axis of said lens 48. When the light source 10 is illuminated, the reflected light rays from the surface of the original 1 provide a latent electrostatic image on the copying material, having a photosensitive coating and fixed on the transport belt 34, by the usual course through mirror 45, lens 48 and mirror 46 shown by the dotted line. The optical detector 11 is located to receive part of the reflected light rays from the mirror 46 and then sense the average optical intensity of the background on the original. When a print button 50 is pushed, a switch 51-A (S2 in FIG. 5) changes so that a keep relay A operates in response to the operation of the print button 50. Then a contact A-1/2 of the keep relay closes to energize a clutch 57 (CL-2 in FIG. 5), so that the movable member 6 extends along the guide rail 5 rightward. As the movable member 6 contacts a switch 51-B, a switch S3 changes position. Thereafter a switch 52 (S4 in FIG. 5) is closed by engagement with the movable member 6. A solenoid for feeding copying material is energized in response to a signal generated when the switch S4 is closed so that the copying paper 54 is fed by rotation of a feed roller 53 combined with a one-revolution clutch, and is then delivered to a roller 36.

Next, a switch 55 (S5 in FIG. 5) is closed by the leading edge of the copying paper fed from the roller 36. Simultaneously the light source 10 (L in FIG. 5) is illuminated through a resistor R by means of a contact B-1/3 activated in response to the operation of a relay B. Then, the detecting circuit X energized so that the detector 11 is in condition for operation. As the optical detector 11 of the movable member 6 detects the change in optical intensity, a relay D of the detecting circuit operates (See FIG. 2). A cutter solenoid (SOL-2) is activated in response to change of a contact D-1/1 so that a roll of copying material is cut. At the same time a keep relay A' operates. When a clutch 57 is disconnected from the power supply in response to restoration of the contact A-1/2, the movable member 6 stops. Meanwhile a relay C is operated by the restoration of a contact A-2/2. As the rear edge of the copying material, cut according to the length of the original 1, contacts a switch 55, the detecting circuit X and the relay B are respectively disconnected from the power supply in response to restoration of the switch 55.

As the clutch 29 (CL-1 in FIG. 5) is opened in response to restoration of the contact B-2/3, the transport belt 34 stops. Accordingly a photosensitive sheet stops at the position corresponding to the original 1. The light source 10 of the movable member 6 illuminates fully in response to operation of the contact B-1/3, and then movable member 6 returns to the position of the fitting 3 by way of a motor M2, for moving leftward, activated in response to operation of a contact B-3/3, whereby an image of the original 1 is focused onto the photosensitive sheet.

As the movable member 6 contacts a stopping switch 51-B, the above-mentioned circuit is restored to its initial condition, so that the transport belt 34 moves conveying the photosensitive sheet which has received a latent electrostatic image of the original. Then the copying material bearing the electrostatic image is transported into a developing device and a drying device, and finally fed out of the machine.

As an alternative of the embodiment described above, a reflecting part such as a mirror or metal reflecting plate could be employed instead of the black non-reflecting part 13. In this case, when the amount of reflected light is more than a certain value, a signal is applied to the detecting circuit X, which functions to make a contact thereof operate corresponding to change in optical intensity. As a result the cutter is activated as previously described so as to cut a roll of copy paper in accordance with the length of the original.

It can be seen that we have accomplished the objects of our invention. We have provided a copying machine including a cutter activated in response to change of the optical intensity so as to cut a roll of copying material according to the length of the original when the scanning exposure device has passed over the leading edge of the original. Our machine is provided with a movable member including an illuminating lamp which functions both for detecting the length of the original and for scanning the original.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the united states is:

1. An apparatus for cutting a roll of copying material according to the length of an original, comprising:
    a transparent supporting plate for positioning an original,
    a movable member extending parallel to said transparent supporting plate,
    driving means for moving said movable member and said roll at the same speed in response to an activating signal,
    cutting means for cutting segments from said roll of copying material; and,
    sensing means mounted on said movable member including a light source mounted on said movable member for projecting a light beam on said original and a detector for detecting an edge of said original,
    wherein said cutting means is coupled to said sensing means and is activated by the detection of said edge whereby said roll of copying material is cut according to the length of said original.

2. An apparatus for cutting a roll of copying material according to the length of an original, as in claim 1, wherein:
    said detector of said sensing means comprises a semiconductor switch.

3. An apparatus for cutting a roll of copying material according to the length of an original as in claim 1, wherein:
    said detector of said sensing means comprising a silicon controlled rectifier.

4. An apparatus for cutting a roll of copying material according to the length of an original as in claim 1, wherein:
    said light source of said sensing means provides light for scanning said original and for detecting an edge thereof.

5. An apparatus for cutting a roll of copying material according to the length of an original, which comprises:

a transparent supporting plate for positioning an original,
    a movable member extending parallel to said transparent supporting plate,
    a light source for scanning said original mounted on said movable member,
    driving means for moving both said movable member and said roll of copying material at the same speed in response to an activating signal,
    means for cutting said roll of copying material,
    means mounted on said moving member for detecting the optical intensity of light from said light source reflected from the surface of said original, wherein said cutting means is coupled to said last named means and responds to the output thereof for cutting said roll of copying material in response to variations in said optical intensity.

6. An apparatus for cutting a roll of copying material according to the length of an original as in claim 5, wherein:

said means mounted on said moving member for detecting comprises a semiconductor switch.

7. An apparatus for cutting a roll of copying material according to the length of an original as in claim 5, wherein:

said means mounted on said moving member for detecting comprises a silicon controlled rectifier.

8. An apparatus for cutting a roll of copying material according to the length of an original as in claim 5, wherein:

said light source provides illumination for enabling both scanning and length detecting.

* * * * *